(12) United States Patent
Bunsey et al.

(10) Patent No.: US 8,064,082 B2
(45) Date of Patent: Nov. 22, 2011

(54) SYSTEM AND METHOD FOR PRINTING LABELS ON-DEMAND

(75) Inventors: Robert J. Bunsey, Cleveland, OH (US); Richard J. Bunsey, Cleveland, OH (US)

(73) Assignee: Computer Software Corporation, Cleveland, OH (US)

( * ) Notice: Subject to any disclaimer, the term of this patent is extended or adjusted under 35 U.S.C. 154(b) by 481 days.

(21) Appl. No.: 11/460,426

(22) Filed: Jul. 27, 2006

(65) Prior Publication Data
US 2006/0275065 A1    Dec. 7, 2006

Related U.S. Application Data

(63) Continuation-in-part of application No. 11/056,570, filed on Feb. 11, 2005, now abandoned.

(60) Provisional application No. 60/544,580, filed on Feb. 13, 2004.

(51) Int. Cl.
*G06F 3/12* (2006.01)

(52) U.S. Cl. .............. 358/1.15; 358/1.13; 358/1.14; 235/375; 235/376; 235/386; 705/28; 902/2

(58) Field of Classification Search .......... 358/1.12, 358/1.15, 1.14, 1.13; 235/385, 375, 376, 235/386; 705/28; 902/2; 335/376
See application file for complete search history.

(56) References Cited

U.S. PATENT DOCUMENTS

| | | | |
|---|---|---|---|
| 5,621,864 A * | 4/1997 | Benade et al. ............... | 358/1.18 |
| 5,900,610 A | 5/1999 | Kelly, Jr. | |
| 5,923,014 A | 7/1999 | Szymusiak et al. | |
| 6,679,421 B2 | 1/2004 | Shin et al. | |
| 6,910,076 B2 * | 6/2005 | Lortz ............................ | 709/229 |
| 2003/0201320 A1 * | 10/2003 | Venkatesh et al. ............ | 235/383 |
| 2004/0195307 A1 * | 10/2004 | De Mol Van Otterloo ... | 235/375 |
| 2005/0086394 A1 * | 4/2005 | Kitada et al. ..................... | 710/1 |
| 2005/0137937 A1 * | 6/2005 | Njo et al. ........................ | 705/26 |

OTHER PUBLICATIONS

WAL 2100 Industrial Print Terminal (IPT), General Data 2001.*
WAL 2100 Industrial Print Terminal, Jan. 19, 2004, Data Collection for Business.

* cited by examiner

*Primary Examiner* — Chan S Park
*Assistant Examiner* — Jacky X Zheng
(74) *Attorney, Agent, or Firm* — Renner, Otto, Boisselle & Sklar, LLP

(57) ABSTRACT

The present invention relates to a system and method for printing labels on-demand in a manufacturing environment. During initialization, an association is made between a part being manufactured and the work station in which the part is made. The association is stored in a computer application. When a user desires to print a label, the user simply presses a user input device which generates a print request. The print request is interrogated to determine which user input device originated the print request. An indicator may be presented to the operator indicating that a valid print request was received by the data storage device. The computer application searches for information related to the user input device that originated the print request. The data storage device transmits information from the computer application for printing to the associated printer.

16 Claims, 6 Drawing Sheets

| Internal Part No. | Description | Customer Part No. | Customer ID | Address | Bill of Lading | Associated User ID (Port) | Associated IP Address | Enabled? |
|---|---|---|---|---|---|---|---|---|
| 1000-105 | Steering column | A100-15 | Ford | ... | 10003 | 1 | 192.4.44.36 | Y |
| 1100-110 | Plunger | A110-11 | GM | ... | 10123 | 24 | 192.4.44.39 | Y |
| 1200-100 | Brake Pad | XYZ-800 | Chrysler | ... | 11045 | 5 | 192.4.44.34 | N |
| 1300-120 | Screws | S1300-12-0 | Honda | ... | 11004 | 10 | 192.4.34.45 | N |
| 1400-100 | Bearings | B14-1-0-0 | Ford | ... | 15003 | 15 | 192.4.45.50 | Y |
| 1500-150 | Nuts | 1500-150 | Chrysler | ... | 15679 | 23 | 192.4.45.51 | N |
| 1500-160 | Bracket | B1500-16-0 | GM | ... | 14093 | 36 | 192..4.54.61 | Y |
| ... | ... | ... | ... | ... | ... | ... | ... | ... |

Figure 5

SYSTEM AND METHOD FOR PRINTING LABELS ON-DEMAND

RELATED APPLICATION DATA

This application is a continuation-in-part of U.S. application Ser. No. 11/056,570, filed on Feb. 11, 2005, which claims the benefit of U.S. Provisional Application No. 60/544,580, filed Feb. 13, 2004, all of which is incorporated herein by reference.

BACKGROUND OF THE INVENTION

1. Technical Field

The present invention relates to a system and method for printing labels on-demand in a manufacturing environment and particularly to a system and method that permits the contents of the labels to be updated until just prior to printing in order to ensure that the information placed on the label is accurate and eliminates the mislabeling of parts and associated packaging.

2. Description of the Related Art

The automotive industry places an ever increasing demand on its suppliers for high quality parts. Quality is not only defined by the actual parts being manufactured and supplied by a particular supplier, but also on the contents of the labels that are used to identify the parts. Mislabeled parts have been a continuous source of quality problems for suppliers. This problem has grown in recent years due to the automotive industry's implementation of a number of "just-in-time" and "sequenced parts delivery" initiatives. These initiatives essentially require suppliers to deliver manufactured parts just-in-time for the parts to be used by the manufacturer and in the proper sequence set forth by the manufacturer. The goal of these initiatives was to maximize the manufacturer's use of floor space, reduce inventory levels and decrease the time consumers' wait for vehicles.

Proper labeling is an essential element of quality and a requirement for an effective sequencing program. In addition to internal supplier labeling requirements, the automobile manufacturer often requires specific labels to be affixed to the supplied parts and/or the container in which the parts are shipped. While the specific requirements for the contents of labels may vary greatly, typical sequenced parts programs require the part (or container which houses the part) to have a barcoded label along with some basic part information, such as a description, sequence number, customer part number, revision number, etc. In many instances, the information is subject to change by the manufacturer until just prior to shipping the part to be supplied.

Suppliers have implemented a variety of ways for manufactured parts to be labeled. In one method, the information technology department prints a batch of labels. The labels are then distributed by a production controller to the appropriate person that packages the part or device into the appropriate shipping package. A disadvantage associated with this method is that there is an overall loss of control over the labeling process. For example, it becomes difficult or impossible to accurately manage inventory and track production. Another disadvantage is that it is difficult to ensure that the right label is placed on the appropriate part or shipping container. Likewise, in many cases, the number of labels will not match the number of parts being manufactured. Therefore, there is a great likelihood of excess labels being produced which leads to expensive waste and possibly to the wrong label being used to identify a part.

Another popular method used by many manufacturers is the "kiosk" model. In the kiosk model, multiple personal computers located on the factory floor have a dedicated label printer or share a common label printer. Workers are required to interact with software, usually in the form of drop down menus to make a variety of selections (e.g., to identify the part numbers, select the quantity of labels needed, etc.). Problems associated with this method include susceptibility to human error, too many labels may be printed thereby resulting in increased waste, and an overall loss of control by management to accurately manage inventory and track production.

When manufacturing customers receive mislabeled parts there can be severe consequences. For instance, mislabeled parts make assembly lines less efficient. In some particular instances, mislabeled parts may even cause a complete shutdown of an assembly line. Such a consequence is particularly likely to occur when a new revision is made to a particular part and the revision is not reflected correctly on the label. An assembly line worker must take additional time to ensure that the correct part is being installed or the assembly line worker could just reject the entire lot of mislabeled parts out of hand. This lost efficiency leads to a significant loss of time and money to both the manufacturer and supplier of the mislabeled part. In addition, mislabeled parts reflect poorly on the supplier that supplied the part to the manufacturer and may result in the loss of a contract to supply parts to the manufacturer in the future.

Accordingly, there exists a need in the art for an improved system and method for properly labeling manufactured parts.

SUMMARY OF THE INVENTION

The present invention relates to a system and method for printing labels on-demand by associating a particular work station with a user input device for generating a print request and a printer for printing an associated label.

In one embodiment, the present invention is directed to a system for generating a label, the system comprising: a user input device communicatively coupled to a wireless bridge, wherein the user input device is actuable by an associated user action to generate a print request; a data storage device communicatively coupled to the wireless bridge, wherein the data storage device includes information related to the print request; and a printer communicatively coupled to the data storage device, wherein the printer receives a least a portion of the information from the storage device and prints at least a portion of the received data on an associated label.

In another embodiment, the present invention is directed to a method for generating a label, the method comprising: generating a print request from a user input device communicatively coupled to a wireless bridge; transmitting the print request from the wireless bridge to the data storage device over the air; receiving the print request at the data storage device; identifying at least an IP address associated with the print request; transmitting information stored on the data storage device to a printer; and printing at least a portion of the information transmitted to the printer on an associated label.

In another embodiment, the present invention is directed to a method for generating a label, the method comprising: generating a print request from a user input device communicatively coupled to a wireless bridge; transmitting the print request from the wireless bridge to the data storage device over the air; interrogating the print request to determine an IP address for the wireless bridge that originated the print request; searching a database for information related to the wireless bridge that originated the print request, wherein the database includes an IP address of a printer associated with the print request; transmitting at least a portion of the information from the database to the printer; and printing at least a portion of the information transmitted to the printer on an associated label.

In another embodiment, the present invention is directed to a method for generating a label, the method comprising: generating a print request from a user input device communicatively coupled to a wireless bridge; transmitting the print request from the wireless bridge to the data storage device over the air; interrogating the print request to determine an IP address for the wireless bridge that originated the print request; searching a database for information related to the wireless bridge that originated the print request; and transmitting at least a portion of the information from the database to the wireless bridge for routing to an associated printer.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

BRIEF DESCRIPTION OF THE DRAWINGS

FIG. 5 is an exemplary part information database.

DETAILED DESCRIPTION OF THE INVENTION

Figure 1:
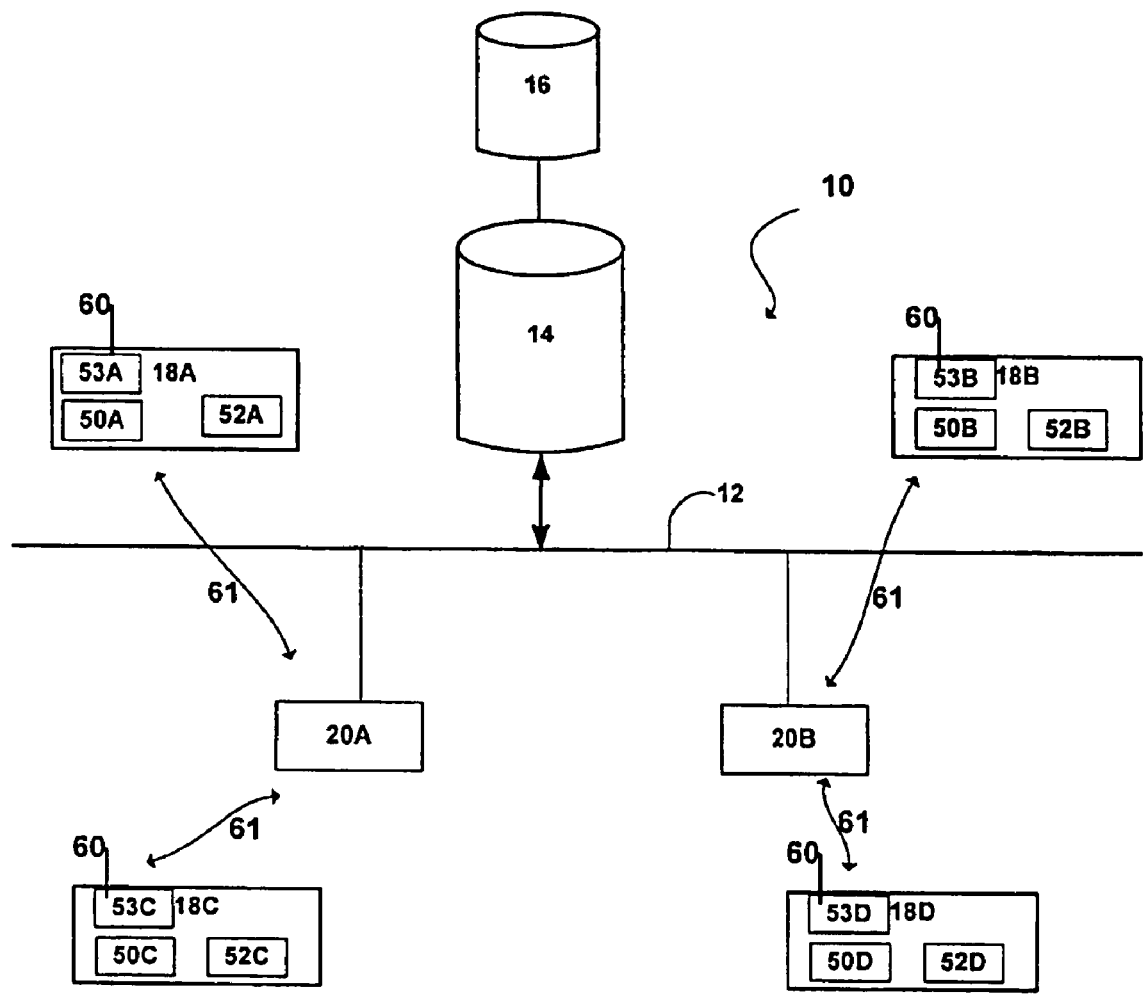
FIG. 1 is an exemplary system diagram of a local area network in accordance with the present invention.

A local area network (LAN) 10 in accordance with the present invention is illustrated in FIG. 1. As shown, the LAN 10 includes a communications medium 12, a server 14, an electronic data interchange (EDI) and enterprise resource planning (ERP) server 16, one or more work stations 18A-18D, and one or more wireless controllers 20A-20B.

The communications medium 12 can take the form of any medium that permits electronic devices to exchange information or data. For instance, the communications medium 12 may be a wired communications medium, such as Ethernet or a wireless communications medium, such as IEEE 802.11b or 802.11g. In addition, the communications medium 12 may also be a combination of wired and wireless communications mediums. Preferably, the communications medium 12 is at least partially wired Ethernet communications medium. However, one of ordinary skill in the art will readily appreciate that any communications medium having the functionality described herein shall be deemed to be within the scope of the present invention.

Figure 2:
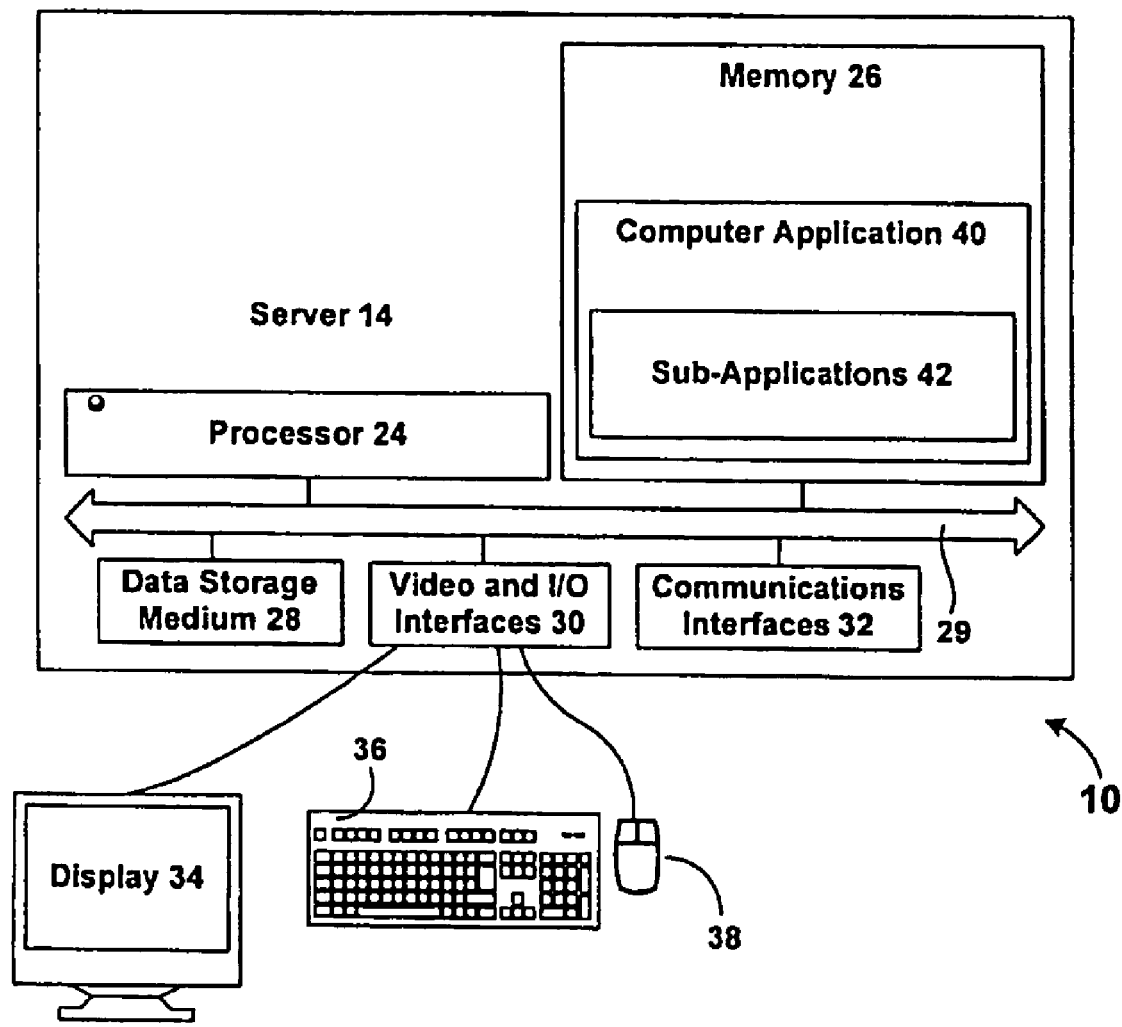
FIG. 2 is a block diagram of an exemplary server in accordance with the present invention.

FIG. 2 illustrates a schematic block diagram of server 14. The server 14 (also known as a data storage device) generally includes a processor 24, a memory 26, a data storage medium 28, a local interface 29, video and input/output interfaces 30, and various communication interfaces 32. The server 14 may include optionally a display 34, a keyboard 36, and a user input device 38 (e.g., a computer mouse). The server 14 is capable of executing one or more computer applications 40 in accordance with aspects of the present invention. In one embodiment, computer application 40 includes a database for storing and organizing information related to a part or item being manufactured (e.g., a part to be supplied to an original equipment manufacturer (OEM) or an upper tier supplier) and communications software, which permit the values stored in the database to be transmitted to and updated by various local and remote devices. The computer application 40 may be logically associated with or call one or more additional computer applications or one or more sub-computer applications 42, which generally include compilations of executable code.

In one embodiment, the computer application 40, and/or the sub-applications 42 are embodied as one or more computer programs (e.g., one or more software applications including compilations of executable code). The computer program(s) can be stored on a data storage medium 28 or other computer readable medium, such as a magnetic or optical storage device (e.g., hard disk, CD-ROM, DVD-ROM, etc.).

To execute the computer application 40 and associated database and sub-applications 42, the server 14 can include one or more processors 24 used to execute instructions that carry out a specified logic routine(s). Preferably, the server 14 is based on a client—server architecture and may serve multiple clients. However, one of ordinary skill in the art will readily appreciate that any combination of computers having the functionality described herein shall be deemed to be within the scope of the present invention.

The server 14 may have a memory 26 for storing data, software, logic routine instructions, computer programs, files, operating system instructions, and the like. As illustrated in FIG. 2, the computer application 40 and sub-applications 42 can be stored in the memory 26. The memory 26 can comprise several devices and includes, for example, volatile and non-volatile memory components. Accordingly, the memory 26 can include, for example, random access memory (RAM), read only memory (ROM), hard disks, floppy disks, compact disks (e.g., CD ROM, DVD ROM, CD RW, etc.), tapes, and/or other memory components, plus associated drives and players for these memory types. The processor 24, memory 26 and the data storage medium 28 are coupled using a local interface 29. The local interface 29 can be, for example, a data bus with accompanying control bus, a network, or other subsystem.

The server 14 can have various video and input/output interfaces 30 as well as one or more communications interfaces 32. The interfaces 30 can be used to couple the server 14 to various peripherals, such as a display 34 (e.g., a CRT display, an LCD display, a plasma display, etc.), a keyboard 36, and a user input device 32. The communications interfaces 32 can be comprised of, for example, a modem, a network interface card, and/or a wireless network interface card. The communications interfaces 32 can enable the server 14 to transmit and receive data signals, voice signals, video signals, and the like via an external network, such as the Internet, a wide area network (WAN), a local area network (LAN), direct data link, or similar wired (e.g., Ethernet) or wireless system (e.g., 802.11b). Preferably, the system 10 has the capabilities for both a wired communications interface (e.g., Ethernet) and a wireless communications interface (e.g., 802.11b) to accomplish the functionality described herein. However, one of ordinary skill in the art will readily appreciate that a wireless communication medium and a wired communication medium may be used interchangeably to accomplish the functionality described herein and any such arrangement shall be deemed to be within the scope of the present invention.

The server 14 transmits and receives information or data to and from peripherals or devices located at or near one or more respective work stations 18A-18D, as illustrated in FIG. 1. As used herein, the phrase "work station" identifies a point in the manufacturing process wherein it is deemed desirable for a part (or item) to be identified with a label (e.g., when the part is ready to be inserted into a container; packaged for shipment; or for internal identification purposes and the like).

Figure 3A:
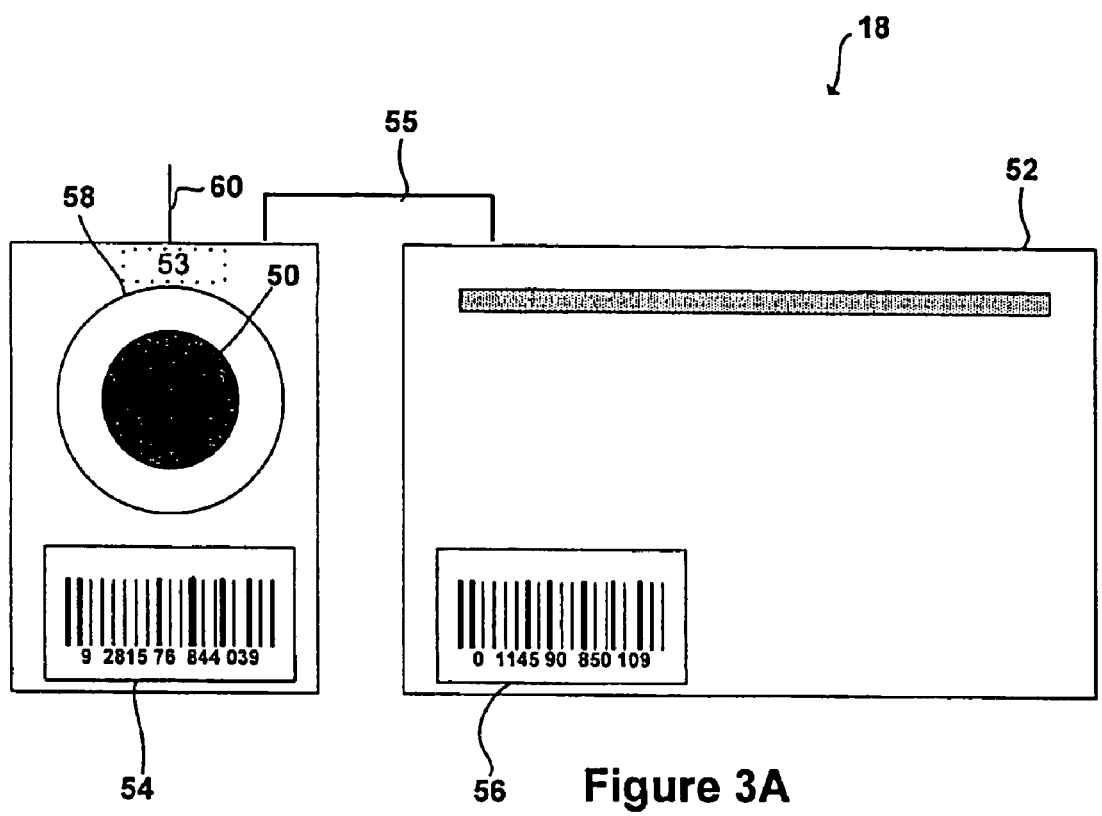
FIGS. 3A and 3B are block diagrams of exemplary work stations in accordance with the present invention.
Figure 3B:
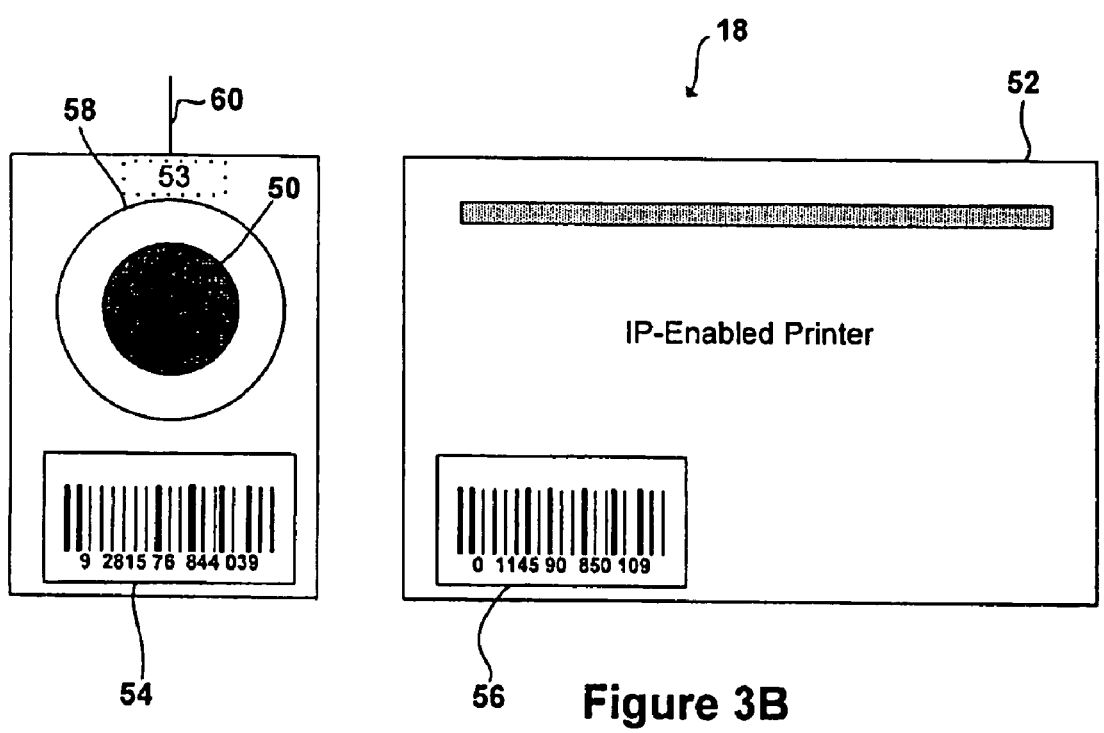

As shown in FIG. 1, each work station 18A-18D is associated with a respective work area wherein a part (or item) is undergoing at least one step in the manufacturing process. Exemplary work stations are depicted in FIGS. 3A and 3B. The work station 18 generally includes a user input device 50, a printer 52 and a wireless bridge 53 integrated in the user input device 50. The user input device 50 may be any type of device (e.g., a push-button switch) that outputs a predetermined response upon user activation. The user input device 50 may be coupled to the wireless bridge 53 in any manner. In one embodiment, the user input device is communicatively coupled to the wireless bridge through a serial port (e.g., an RS-232 port).

The printer 52 may be any type of printing device, including for example, a barcode printer, a thermal transfer printer, a RFID printer, etc. In one embodiment, the wireless bridge 53 is communicatively coupled to the printer 52 through a serial port 55 (e.g., RS-232) to facilitate the exchange of information from the data storage device 14 to the printer 52, as shown in FIG. 3A. In another embodiment, the wireless bridge 53 is communicatively coupled to an Ethernet printer (e.g., an IP-enabled printer) (wired or wireless) via the server 14, as shown in FIG. 3B. In this case, the Ethernet printer 52 has been previously associated to the user input device 50 through, for example, a scan of the barcode 54 on the user input device 50 and a scan of the barcode 56 on the IP-enabled printer, as described below. In such case, the user input device 50 is not communicatively coupled via a cable 55 to the printer 52. The Ethernet printer 52 is capable of receiving information directly from the server 14. As one of ordinary skill in the art will appreciate, the term "directly" as used herein relates to the destination IP address of a device. For example, the communication is direct if the server 14 transmits information to the IP address of the printer. On the other hand, communication is indirect if the server 14 transmits the information to the IP address of another device (e.g., wireless bridge 53), which then routes the information to the printer.

The user input device 50 and the printer 52 each may include an identifier. The identifier may take any form including a label, hardware identifiers embedded in the respective devices, radio frequency identification chips, etc. As described herein, the identifiers are in the form of a label located on the outer periphery of the device for identification purposes. Preferably, the identification of the user input device 50 and the printer 52 is accomplished through the use of barcode labels 54 and 56, respectively. The barcode labels 54 and 56 permit a supervisor (or other authorized personnel) to easily associate the user input device 50 and the printer 52 to a particular work station manufacturing a specific part.

As discussed more fully below, barcode labels 54 and 56 may be scanned with a barcode scanner (not shown). Thus, the barcode labels 54 and 56 provide a convenient mechanism for association of the user input device 50 and the printer 52 with a particular work station 18 (or part being manufactured). One of ordinary skill in the art will readily appreciate that many other methods may be used to associate a particular device with a specific work station 18. For example, a user may manually insert the identification of the devices associated with work station directly into the server 14 and computer application 40 through the keyboard 36, as illustrated in FIG. 2.

The user input device 50 is a push-button switch that may include an indication mechanism 58. The indication mechanism 58 provides a visible mechanism to the operator in order to indicate when the user input device 50 has been depressed. For example, as shown in FIG. 3, the indication mechanism 58 may include a ring surrounding the user input device 50, which illuminates when the user imparts a sufficient amount of force on the user input device 50 to trigger the user input device 50 to change states. In another embodiment, the push-button switch that comprises the user-input device 50 may also include an indication mechanism, wherein the push-button switch illuminates when activated by an associated user. The indication mechanism 58 is provided in order to prevent the operator from depressing the user input device 50 multiple times because the operator is not sure if the user input device 50 was originally pressed. In addition, time delays may be programmed into the user input device 50. For example, once the user input device 50 is activated, the user input device is unable to generate another print request for a predetermined period of time. Thus, the indicator mechanism 58 serves to prevent material waste and provides additional inventory and production controls for management.

Referring back to FIG. 1, the user input device 50 may be connected to the data storage device 14 by any means, including wired or wireless communications media, and communicate through any using any appropriate communications protocol (e.g., TCP/IP). Preferably, the user input device 50 is communicably coupled to the data storage device 14, at least partially, through a wireless communication medium using a suitable wireless communication protocol (e.g., 802.11b, 802.11g, etc.).

As shown in FIG. 1, each workstation 18 may include a wireless bridge 53. Preferably, the wireless bridge 53 includes a suitable antenna 60 to facilitate communication between the wireless bridge 53 and the wireless controller 20. The wireless bridge 53 generally couples the work station 18 to the data storage device 14 through the wireless controller 20. In use, once the associated user activates the user input device 50, for example by imparting a sufficient force on the user input device 50 to change the state of the device, the wireless bridge 53 transmits a message (e.g., a print request) through the wireless communication medium to the data storage device 14. Since the message is an Ethernet-type message, the message generally includes a unique IP address associated with the wireless bridge 53. Upon interrogating the message, the data storage device 14 through the computer application 40 is able to determine the source (e.g., the requesting work station 18) of the message, as well as any additional information needed to make a label (e.g., part number, label data, label format, etc.).

The information needed to make the label is then transmitted by the wireless communication medium 61 to either the wireless bridge 53 or to an Ethernet printer. The wireless bridge 53 may include one or more ports that are capable of controlling one or more devices. For example, the wireless bridge 53 may include one or more serial ports 55 (e.g., RS-232 ports) that are capable of communicably coupling the wireless bridge 53 with a printer 52.

Figure 4:
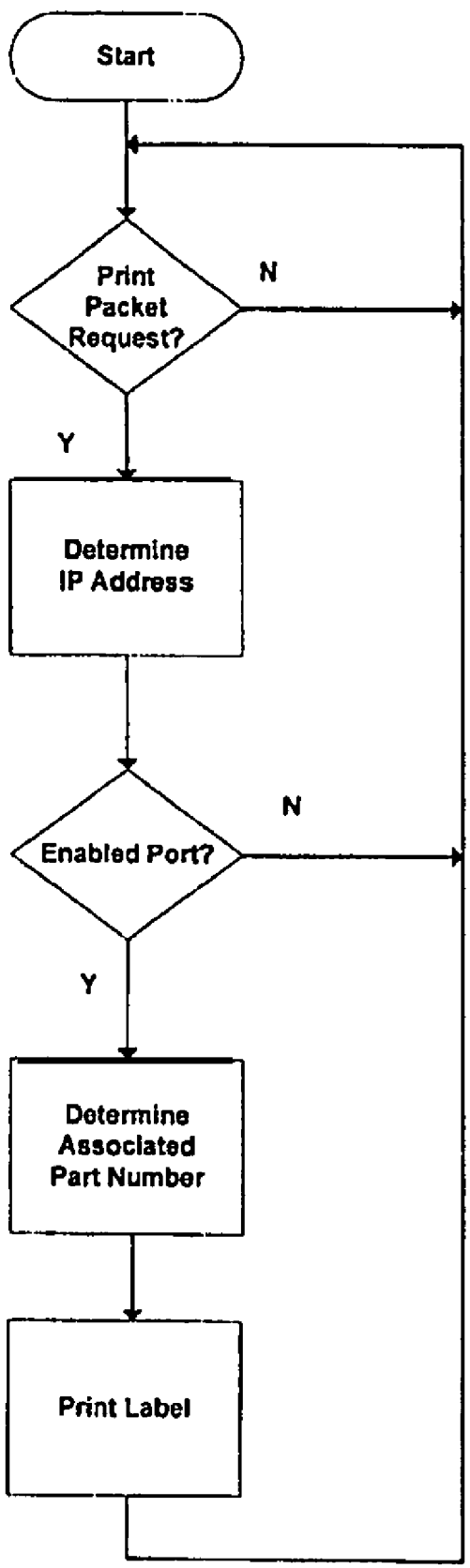
FIG. 4 is a flow chart illustrating the generation of a print request.

As shown in FIG. 4, computer application 40 continuously monitors (or listens) for the arrival of print request packets. Once such a packet is detected, the computer application 40 interrogates the data contained in the packet in order to determine the IP address of the wireless bridge 53 that originated the print request. While interrogation of the print request packet has been described as occurring in computer application 40, one of ordinary skill in the art will readily appreciate that interrogation of the print request packet may occur in hardware or in another computer application or sub-application or a combination of hardware and software.

The computer application 40 determines if the particular IP address (which is associated with a user input device 50) is in an "enabled" status. As discussed more fully below, a user input device is "enabled" if its associated user input device 50 is designated as "enabled" in the computer application 40 associated with the port (or user input device). If the port is "enabled," the data storage device 14 (e.g., a server) may send a command to the wireless bridge 53 via the wireless communications medium to allow indicator mechanism 58 to illuminate or otherwise signal to an associated user that the user input device 50 is enabled and/or requested a label to be printed. Generally, the indicator mechanism 58 outputs an indication to the operator (e.g., light, sound, tactile touch, etc.), which informs the operator that the server 14 sensed the change in state of the user input device 50 and that the user input device 50 is properly "enabled."

If a print request is received from an "enabled" user input device, the server 14 through the computer application 40, searches a database (described below) for an internal cross-reference table to find the current association between the activated port, the associated printer 52 and the part being manufactured.

Once the computer application 40 determines the part number associated with the activated user input device 50, the computer application 40 may parse the data that will appear on the printed label. The computer application 40 may then create a data stream in the native language of the printer 52. In one embodiment, the server 14 transmits the data stream to the wireless bridge 53, which outputs the information to the printer 52. In another embodiment, the server 14 may transmit the data stream directly to the IP address of the printer 52.

Preferably, the server 14 transmits the data stream to wireless controller 20 via the communications medium 12. In turn, the wireless controller 20 transmits the data stream to the IP address of the wireless bridge 53 which may output the information to printer 52 or the wireless controller 20 transmits directly to the wireless Ethernet printer. It is preferable to use a wireless communications medium with user input device 50 and/or printer 52 to logistically place the user input device and/or printer in the most convenient workspace for the operator.

The data stream transmitted to the printer 52 may include commands to format the label, (e.g., pertinent human readable data to print on the label such as part number and quantity, and other data which will print as one or more barcodes on the label). The printer 52 receives the label data stream and prints the label. One label is generally printed for each print request (i.e., activation of the user input device 50). In general, the total round trip duration from activation of the user input device 50 to the label being printed is approximately two to three seconds. Thus, the present invention provides an efficient and convenient system and method for printing labels while also allowing management to maintain control of the labeling and manufacturing processes.

While each work station 18 generally includes a user input device 50, a printer 52, and a wireless bridge 53, it may be advantageous, to integrate or combine the user input device 50, printer 52, and wireless bridge 53 into a single unit (not shown).

Initialization and data flow associated with the present invention will now be discussed. Referring to FIG. 5, a representative database 70 is shown. The database 70 is generally part of the computer application 40. However, to better describe the organization of the database 70, it has been given a separate reference numeral. The database 70 generally includes multiple columns (fields) and rows (records) organized by any of a variety of information. For purposes of illustration, the representative database 70 includes the following representative column (field) headings: Internal Part No., Description, Address, Customer Part Number, Bill of Lading Number, associated user input device (or port), associated IP address, status, etc. Additional data that may be contained in database 70 includes: Ship Date, Label Style, Quantity, Advance Shipping Notice Identification, Supplier Name, Supplier Address, Lot Number, etc. Each row (record) of the database 70 typically includes information related to a different part being manufactured in the location of the LAN 10.

Referring back to FIG. 1, the server 14 is communicatively coupled to an EDI and ERP server 16. While shown as a single server, the EDI and ERP functions may be separated and located in two separate servers or storage mediums. The EDI and ERP server 16 contains a master list of information necessary to process electronic requests from a variety of sources. In order to keep the information on the server 14 as accurate as possible, the server 14 may download information from the EDI and ERP server 16 manually at any time or automatically at predetermined intervals. Preferably, the server 14 downloads information from the EDI and ERP server 16 at least once a day. Updating the server 14 with such frequency ensures that any customer changes or modifications to a particular part or order (e.g., the number of parts ordered, the description of the part ordered, etc.) will be properly reflected in the database 70 prior to a label being printed.

The database 70 includes three fields, "Associated User Input Device," "IP Address" and "Status" which require user interaction to initialize and associate a particular part or work station 18 with a user input device 50, a printer 52 and a wireless bridge 53. These variables are set periodically, typically before a particular part is set up to be manufactured. The computer application 40 includes a set-up (or initialization) mode that associates such information with particular peripheral devices (e.g., user input device 50, printer 52, and wireless bridge 53). One of ordinary skill in the art will readily appreciate that there are a number of ways to associate a particular peripheral device with a work station 18. For example, labels may be used, identification may occur in hardware by identifiers embedded in the respective devices, and/or radio frequency identification chips associated with a particular device may be used.

Preferably, a wireless optical barcode scanner (not shown) is used to associate a user input device 50, printer 52 and/or wireless bridge 53 with a particular part in the database 70 during the set-up mode. As stated above, each user input device 50A-50D and printer 52A-52D includes a barcode label 54 and 56, respectively on the exterior of the device so that the device can be scanned by an optical barcode scanner. The optical barcode scanner is generally equipped with radio frequency communication capabilities that will allow the scanner to communicate throughout the application site (i.e., a factory, assembly line, or plant) via radio frequency through a wireless controller 20 to the server 14. One of ordinary skill in the art will readily appreciate the optical barcode scanner may also communicate with other network devices to accomplish the functionality discussed herein.

During the set-up (or initialization) mode, the computer application 40 transmits information to be displayed on the wireless barcode scanner in a menu format. An authorized person (e.g., a supervisor) is queried by the display of the wireless barcode scanner to "enable" or "disable" a user input device 50 and to associate a user input device 50 to a specific work station 18 (or part number) located in the database 70 of the computer application 40. The authorized person selects the appropriate menu choice by using a keyboard located on the handheld terminal to enter the number and then presses the "enter" key.

Figure 6:
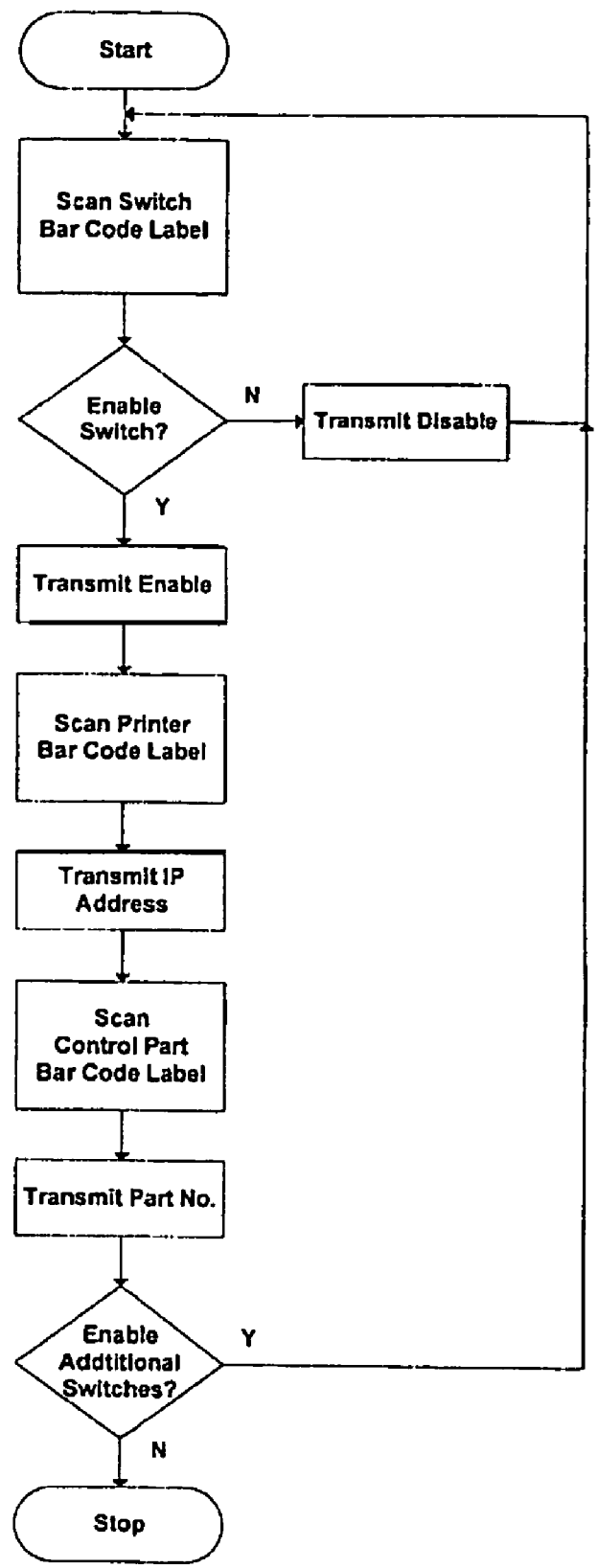
FIG. 6 is a flow chart illustrating associating a particular user input device and particular printer to a particular work station or part.

Referring to FIG. 6, during the set-up (or initialization) mode, an authorized person scans the barcode 54 associated with a particular user input device with a wireless barcode scanner, a screen is displayed querying the operator as to whether the user input device should be "enable" or "disable." If the user selects "disable," computer application 40 receives and stores a "disable" indication for the particular user input device 50 and the process continues by scanning another barcode 54 associated with another user input device 50. If the user desires to "enable" a user input device 50, an "enable" indication is transmitted to the computer application 40 and stored in the database 70. The user is then queried to scan the barcode label 56 associated with the printer 52 and the barcode of the control label or work order, etc. associated with a part undergoing the manufacturing process (not shown). After each of these items is scanned, information related to the scanned label is transmitted to the server 14 and stored in database 70 associated with the computer application 40.

The barcode scanner transmits the information in the format of a suitable communications protocol (e.g., a TCP/IP packet) over the air to the wireless controller 20 (e.g., access point). The wireless controller 20 acts as a bridge between the "air" or wireless network and the wired network. The wireless controller 20 in which a particular barcode scanner transmits data will typically depend upon the geographical location of the barcode scanner in relation to the nearest wireless controller 20. However, one of ordinary skill in the art will readily appreciate that other parameters, such as response time and signal strength may be used to determine which wireless controller 20 receives information transmitted by the wireless barcode scanner. The controller 20, in turn, transfers the identification information to the server 14 where the information is processed and associated with a particular part or parts by computer application 40 and associated database 70.

In one embodiment, the user input device 50 is enclosed in a housing having a faceplate of sufficient area to accept a sample shipping container label. The sample shipping label may be automatically printed at setup time as a result of the "association" of the user input device 50 and the printer 52 to the part number, for example. The sample shipping label is voided in the database 70 so that it cannot be used as an actual shipping container. The sample shipping label can only be used to apply it to the face plate of the user input device 50 so that the operator can instantly see the contents of the labels that will be printed when the user input device 50 is depressed. In addition, the faceplate housing of the user input device 50 preferably has a Teflon surface so that when a new part is being "associated", the previous sample shipping label can easily be removed from the faceplate and the new sample label can be affixed in its place.

After the initial work station is set-up (or initialized), any time the operator desires to print a label, the operator simply changes the state of the user input device 50. As stated above, changing the state of the user input device 50 generates a print request that is transferred from the wireless bridge 53 to wireless controller 20 to the data storage device 14 and/or the computer application 40. If the print request is valid, the indicator mechanism 58 may be powered to provide an indication to the user that the user input device 50 was properly activated. The computer application 40 retrieves information associated with the print request, including the IP address associated with the wireless bridge 53 and the printer 52 of the requesting work station 18 in which the information is to be sent. The server 14 transmits the information to the wireless controller 20, which in turn, transmits at least a portion of the data directly to the printer 52 through a wireless communication medium (e.g., 802.11b, 802.11g, etc.) or through the wireless bridge 53 or through communication media 12 directly to a wired Ethernet printer 52. A label is then printed to correctly identify the part being manufactured at the work station 18.

Although the invention has been shown and described with respect to a certain preferred embodiment or embodiments, it is obvious that equivalent alterations and modifications will occur to others skilled in the art upon the reading and understanding of this specification and the annexed drawings. In particular, with regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A system for generating a label on-demand, the system comprising:
   a push-button switch communicatively directly coupled to a wireless bridge, wherein when the switch is actuated by an associated user action, the switch forms an electric circuit with the wireless bridge to generate a print request for a label without further user interaction and the print request includes a unique identifier associated with the wireless bridge, wherein the unique identifier includes an Internet Protocol (IP) address of the wireless bridge associated with the switch; and
   a data storage device communicatively coupled to the wireless bridge, wherein the data storage device stores information associated with one or more work pieces and the data storage device processes the received print request to identify label information to be transmitted to the IP address of the wireless bridge for printing on a printer associated with the switch, wherein the printer is communicatively coupled to the data storage device and the printer receives a least a portion of the label information from the storage device and prints at least a portion of the received label information in a predetermined manner on the label, wherein the predetermined manner is based on the label information stored on the data storage device.

2. The system of claim 1, wherein the data storage device is communicatively coupled to the wireless bridge at least in part through a wireless controller.

3. The system of claim 1, wherein the data storage device is a server.

4. The system of claim 1, wherein the printer is communicatively coupled to the data storage device through the wireless bridge.

5. The system of claim 1, wherein the wireless bridge routes at least a portion of the label information to the printer.

6. The system of claim 1, wherein the data storage device transmits label information to the IP address of the printer.

7. The system of claim 1, wherein the received label information includes a part number.

8. The system of claim 7, wherein the received label information further includes a barcode.

9. The system of claim 1, wherein the printer is communicatively coupled to the wireless bridge through a serial port.

10. The system of claim 9, wherein the serial port is an RS-232 port.

11. The system of claim 1, wherein the printer is a thermal transfer printer and/or an RFID printer.

12. A method for generating a label on-demand, the method comprising:

generating a print request from a push-button switch communicatively directly coupled to a wireless bridge for printing a predetermined label on-demand, wherein when the switch is actuated by an associated user action, the switch forms an electric circuit with the wireless bridge to generate a print request for a label without further user interaction and the print request includes a unique identifier associated with the wireless bridge, wherein the unique identifier includes an Internet Protocol (IP) address of the wireless bridge associated with the switch;

transmitting the print request from the wireless bridge to a data storage device;

receiving the print request at the data storage device;

identifying the IP address associated with the print request;

transmitting predetermined label information stored on the data storage device to the IP address of the wireless bridge for printing on a printer associated with the switch, wherein the predetermined label information is based on the IP address of the wireless bridge; and printing the predetermined label information transmitted to the printer in a predetermined manner on the label, wherein the predetermined manner is based on label information stored on the data storage device.

13. The method of claim 12, wherein the print request is transmitted to the data storage device through a TCP/IP packet.

14. The method of claim 13, wherein label information stored on the data storage device is transmitted to the wireless bridge and routed to the printer.

15. A method for generating a predetermined label on demand, the method comprising:

receiving a print request caused to be generated from a manually operated push-button switch directly coupled to a wireless bridge, such that when the switch is actuated, the switch forms an electrical circuit with the wireless bridge to generate a print request without further user interaction at a data storage device, wherein the print request includes a unique identifier associated with a wireless bridge that generated the print request based upon activation of the switch and the unique identifier includes an Internet Protocol (IP) address of the wireless bridge associated with the switch;

processing the print request to determine the IP address;

identifying label information associated with the IP address, wherein the label information is stored on the data storage device; and transmitting at least a portion of the label information to the IP address of the wireless bridge for printing a predetermined label on demand at an associated printer coupled to the wireless bridge.

16. The method of claim 15, wherein the print request is received in a form of a TCP/IP packet.

* * * * *